United States Patent
You et al.

(10) Patent No.: US 11,252,610 B2
(45) Date of Patent: Feb. 15, 2022

(54) METHOD AND APPARATUS FOR REMAPPING QOS FLOW, AND COMPUTER STORAGE MEDIUM

(71) Applicant: GUANGDONG OPPO MOBILE TELECOMMUNICATIONS CORP., LTD., Guangdong (CN)

(72) Inventors: Xin You, Dongguan (CN); Cong Shi, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 61 days.

(21) Appl. No.: 16/901,273

(22) Filed: Jun. 15, 2020

(65) Prior Publication Data
US 2020/0314695 A1    Oct. 1, 2020

Related U.S. Application Data

(63) Continuation of application No. PCT/CN2018/076655, filed on Feb. 13, 2018.

(51) Int. Cl.
  *H04W 28/16*  (2009.01)
  *H04L 29/08*  (2006.01)
  *H04L 67/568* (2022.01)

(52) U.S. Cl.
  CPC ......... *H04W 28/16* (2013.01); *H04L 67/2842* (2013.01)

(58) Field of Classification Search
  CPC ..... H04W 28/16; H04W 76/11; H04W 76/15; H04L 67/2842
  See application file for complete search history.

(56) References Cited

U.S. PATENT DOCUMENTS 9,538,575 B2    1/2017  Yamada
10,512,115 B2 * 12/2019  Wu ...................... H04L 63/0876
(Continued)

FOREIGN PATENT DOCUMENTS

CN    1929440 A    3/2007
CN  103875275 A    6/2014
(Continued)

OTHER PUBLICATIONS

International Search Report in the international application No. PCT/CN2018/076655, dated Nov. 2, 2018.
(Continued)

*Primary Examiner* — Chandrahas B Patel
(74) *Attorney, Agent, or Firm* — Perkins Coie LLP

(57) ABSTRACT

A method and a device for remapping a QoS flow, and a non-transitory computer storage medium are provided. The method comprises operations as follow. After a first device determines that a first QoS flow needs to be remapped from a first DRB to a second DRB, an SDAP entity of the first device determines a first data packet, the first data packet being the end data packet transmitted on the first DRB in the first QoS flow. After the SDAP entity of the first device determines that transmission of the first data packet in the QoS flow is completed on the first DRB, the first QoS flow is mapped to the second DRB, and data packets following the first data packet in the first QoS flow is transmitted on the second DRB.

20 Claims, 4 Drawing Sheets

(56) References Cited

U.S. PATENT DOCUMENTS

| | | | | |
|---|---|---|---|---|
| 10,609,763 | B2* | 3/2020 | Jin | H04W 56/0005 |
| 10,979,933 | B2* | 4/2021 | Huang | H04W 76/15 |
| 10,986,557 | B2* | 4/2021 | Zhu | H04W 40/12 |
| 2015/0215965 | A1 | 7/2015 | Yamada | |
| 2016/0050605 | A1 | 2/2016 | Kim et al. | |

FOREIGN PATENT DOCUMENTS

| | | |
|---|---|---|
| CN | 107329913 A | 11/2017 |
| CN | 107439037 A | 12/2017 |
| CN | 107493590 A | 12/2017 |
| WO | 2015002404 A1 | 1/2015 |

OTHER PUBLICATIONS

Huawei et al, "QoS flow to DRB RE-Mapping", R2-1800263, 3GPP TSG-RAN WG2 NR AD hoc1801, Jan. 26, 2018. 4 pages.

Nokia et al, "Qos flow Relocation", R2-1707993, 3GPP TSG-RAN WG2 #99, Aug. 25, 2017. 3 pages.

Media Tek Inc, "QoS flow to DRB remapping during handover", R2-1708004, 3GPP TSG-RAN WG2 Meeting #99, Aug. 25, 2017. 4 pages.

Ericsson, "QoS flow remapping in handover and within the same Cell", R2-1800697, 3GPP TSG-RAN WG2 NR, AH#1801, Jan. 26, 2018. 3 pages.

First Office Action of the Chinese application No. 202010342594.X, dated Jul. 5, 2021. 15 pages with English translation.

First Office Action of the European application No. 18906172.4, dated Aug. 17, 2021. 8 pages.

Second Office Action of the Chinese application No. 202010342594.X, dated Sep. 24, 2021. 9 pages with English translation.

Written Opinion of the International Search Authority in the international application No. PCT/CN2018/076655, dated Nov. 2, 2018.

Session Chair (InterDigital), Report from LTE and NR User Plane Break-Out Session, Approval, 3GPP TSG-RAN WG2 NR Ad hoc 1801, Jan. 22-Jan. 26, 2018.

Supplementary European Search Report in the European application No. 18906172.4, dated Oct. 16, 2020.

3GPP TSG-RAN WG2#99 Meeting, R2-1708938, Huawei, HiSilicon, "QoS Flow to DRB Re-Mapping", mailed on Aug. 20, 2017.

3GPP TSG-RAN WG2 Meeting #97, R2-1701119, ZTE, ZTE Microelectronics, "Further discussion on the new UP protocol layer for QoS", mailed on Feb. 4, 2017.

3GPP TSG-RAN3 Meeting #95bis, R3-171072, Huawei, "Data forwarding with QoS flow relocation", mailed on Mar. 25, 2017.

* cited by examiner

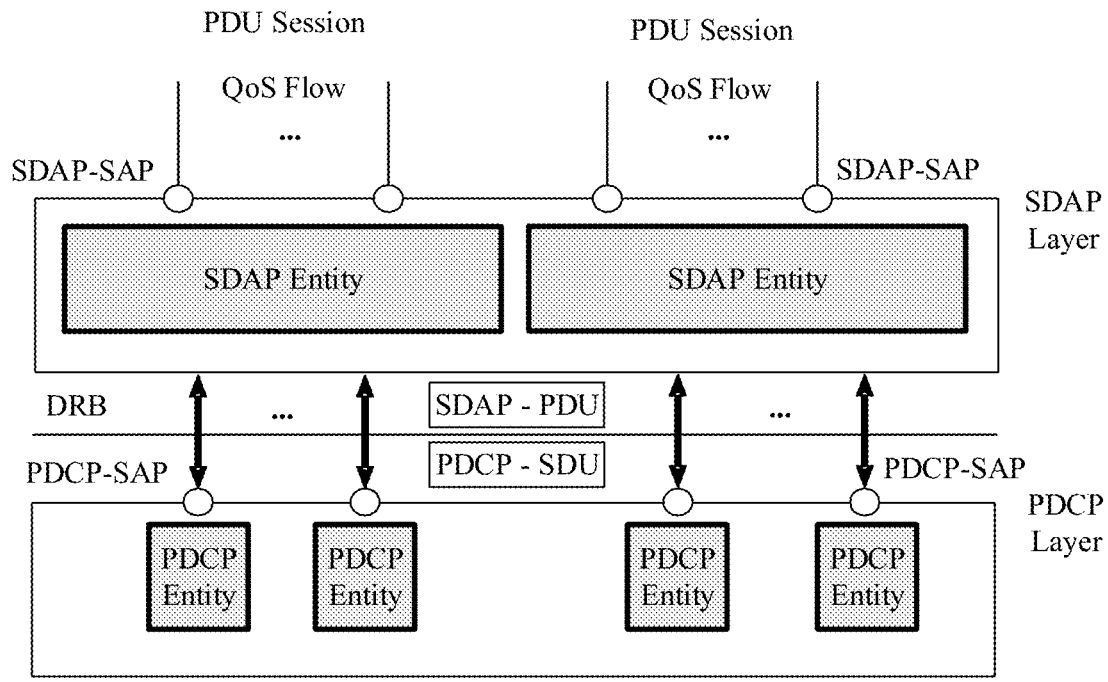

FIG. 3

| After a first device determines that a first QoS flow needs to be remapped from a first DRB to a second DRB, an SDAP entity of the first device determines a first data packet, the first data packet is the end data packet sent on the first DRB, in the first QoS flow | 401 |

| After the SDAP entity of the first device determines that transmission of the first data packet in the first QoS flow is completed on the first DRB, the first QoS flow is mapped to the second DRB, and data packets following the first data packet in the first QoS flow are transmitted on the second DRB | 402 |

FIG. 4

METHOD AND APPARATUS FOR REMAPPING QOS FLOW, AND COMPUTER STORAGE MEDIUM

CROSS-REFERENCE TO RELATED APPLICATIONS

This is a continuation application of International Patent Application No. PCT/CN2018/076655, filed on Feb. 13, 2018, the disclosure of which is hereby incorporated by reference in its entirety.

BACKGROUND

Qos mapping in the 5th Generation (5G) New Radio (NR) mainly includes Non-Access Stratum (NAS) mapping and Access Stratum (AS) mapping, and specifically includes the following two kinds of mappings: mapping from an Internet Protocol (IP) flow to a QoS flow, and mapping from a QoS flow to a Data Radio Bearer (DRB).

When a Radio Resource Control (RRC) connection is initially established, only a default DRB is established on a Radio Access Network (RAN) side, and data from different QoS flows are mapped to the default DRB. After a DRB corresponding to a certain QoS flow is established in the later period, data of the QoS flow needs to be remapped to a new DRB. As shown in FIG. 1, when the RRC connection is initially established, both QoS flow1 and QoS flow2 are mapped to DRB1. After DRB2 (which accommodate the requirements of QoS flow2) with a higher priority is established, data of QoS flow2 needs to be remapped to DRB2.

In addition to the above scenarios, QoS flow remapping may also occur in handover and dual-connection scenarios. A problem to be solved is how to ensure that data of the QoS flow is transmitted without interruption and packet loss during remapping, and can be delivered in sequence at a receiving end.

SUMMARY

The embodiments of the disclosure provide a method and device for remapping a QoS flow, and a non-transitory computer storage medium.

According to a first aspect of the disclosure, the method for remapping a QoS flow provided by the embodiments of the disclosure may include operations as follows.

After a first device determines that a first QoS flow needs to be remapped from a first DRB to a second DRB, a Service Data Adaptation Protocol (SDAP) entity of the first device determines a first data packet. The first data packet is the end data packet, sent on the first DRB, in the first QoS flow.

After the SDAP entity of the first device determines that transmission of the first data packet in the first QoS flow is completed on the first DRB, the first QoS flow is mapped to the second DRB, and data packets following the first data packet of the first QoS flow is transmitted on the second DRB.

In a second aspect of the disclosure, the device for remapping a QoS flow provided by the embodiments of the disclosure is applied to a first terminal. The device includes a first determination unit, a second determination unit, a third determination unit and a transmission unit.

The first determination unit is configured to determine that a first QoS flow needs to be remapped from a first DRB to a second DRB.

The second determination unit is configured to determine a first data packet by an SDAP entity of the first device. The first data packet is the end data packet, sent on the first DRB, in the first QoS flow.

The third determination unit is configured to determine, by the SDAP entity of the first device, that transmission of the first data packet in the first QoS flow is completed on the first DRB.

The transmission unit is configured to map the first QoS flow to the second DRB, and transmit, on the second DRB, data packets following the first data packet in the first QoS flow.

In a third aspect of the disclosure, a non-transitory computer storage medium provided by the embodiments of the disclosure has stored thereon computer-executable instructions that when executed by a processor, implement the above method for remapping a QoS flow.

BRIEF DESCRIPTION OF THE DRAWINGS

The drawings described here are used to provide a further understanding to the disclosure, and form a part of the disclosure. The schematic embodiments of the disclosure and descriptions thereof are adopted to explain the disclosure and not intended to form improper limits to the disclosure. In the drawings:

FIG. 3 is a schematic diagram of an SDAP layer and a PDCP layer.

FIG. 4 is a flowchart of a method for remapping a QoS flow according to an embodiment of the disclosure.

DETAILED DESCRIPTION

In order to facilitate understanding of the technical solutions of the embodiments of the disclosure, the concepts related to the embodiments of the disclosure are described below.

Figure 1:
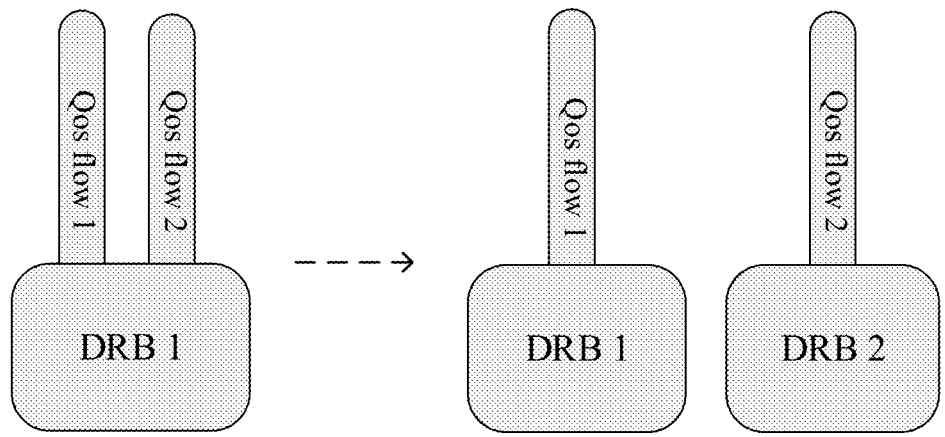
FIG. 1 is a schematic diagram of remapping.
Figure 2:
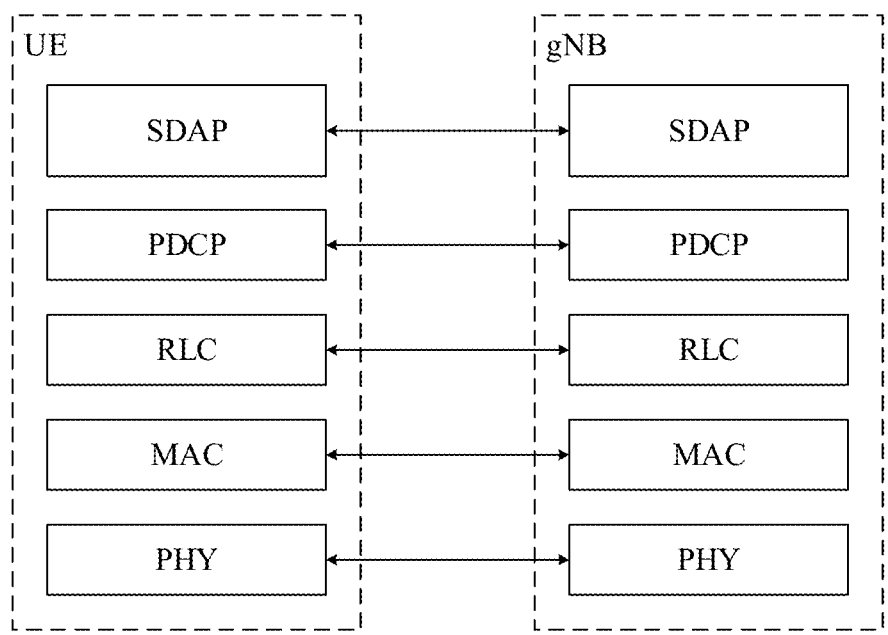
FIG. 2 is a schematic diagram of a protocol layer between a UE and a base station.

Referring to FIG. 2, an AS layer, that is, an SDAP layer is added at each of a terminal (UE) and a base station (gNB). The SDAP layer is used to complete the mapping of QoS flows to DRBs. Referring to FIG. 3, one Protocol Data Unit (PDU) session corresponds to one SDAP entity. One PDU session includes multiple QoS flows. The QoS flows may be mapped to DRBs through the SDAP entity. One DRB corresponds to one PDCP entity.

FIG. 4 is a flowchart of a method for remapping a QoS flow according to an embodiment of the disclosure. As shown in FIG. 4, the method for remapping a QoS flow includes the following operations.

At 401, after a first device determines that a first QoS flow needs to be remapped from a first DRB to a second DRB, an SDAP entity of the first device determines a first data packet. The first data packet is the end data packet sent on the first DRB, in the first QoS flow.

In the embodiments of the disclosure, the first device is a base station or a terminal.

In an implementation manner, the first device determines that the first QoS flow needs to be remapped from the first DRB to the second DRB based on an obtained mapping relationship between the first QoS flow and the second DRB. Here, the mapping relationship between the first QoS flow and the second DRB is determined based on QoS of the first QoS flow or based on an RRC signaling.

At 402, after the SDAP entity of the first device determines that transmission of the first data packet in the first QoS flow is completed on the first DRB, the first QoS flow is mapped to the second DRB, and data packets following the first data packet in the first QoS flow are transmitted on the second DRB.

In the embodiments of the disclosure, the operation that the SDAP entity of the first device determines that transmission of the first data packet in the first QoS flow is completed on the first DRB is implemented by the following processes.

1) The SDAP entity of the first device sends first indication information to a PDCP entity corresponding to the first DRB. The first indication information indicates that the end data packet sent on the first DRB in the first QoS flow is the first data packet.

2) After the PDCP entity corresponding to the first DRB determines that the first data packet is successfully received by a second device, the PDCP entity corresponding to the first DRB sends second indication information to the SDAP entity of the first device. The second indication information indicates that transmission of the first data packet in the first QoS flow is completed on the first DRB.

In the embodiments of the disclosure, the operation that the first QoS flow is mapped to the second DRB and data packets following the first data packet in the first QoS flow are transmitted on the second DRB includes the following operation.

The SDAP entity of the first device maps data packets following the first data packet in the first QoS flow to the second DRB, and a PDCP entity corresponding to the second DRB sends the data packets following the first data packet in the first QoS flow.

In an implementation manner, after the first device determines that the first QoS flow needs to be remapped from the first DRB to the second DRB, the SDAP entity of the first device caches the data packets following the first data packet in the first QoS flow. Correspondingly, the operation that the first QoS flow is mapped to the second DRB and data packets following the first data packet in the first QoS flow are transmitted on the second DRB includes the following operation. The cached data packets following the first data packet in the first QoS flow are transmitted on the second DRB.

Figure 5:
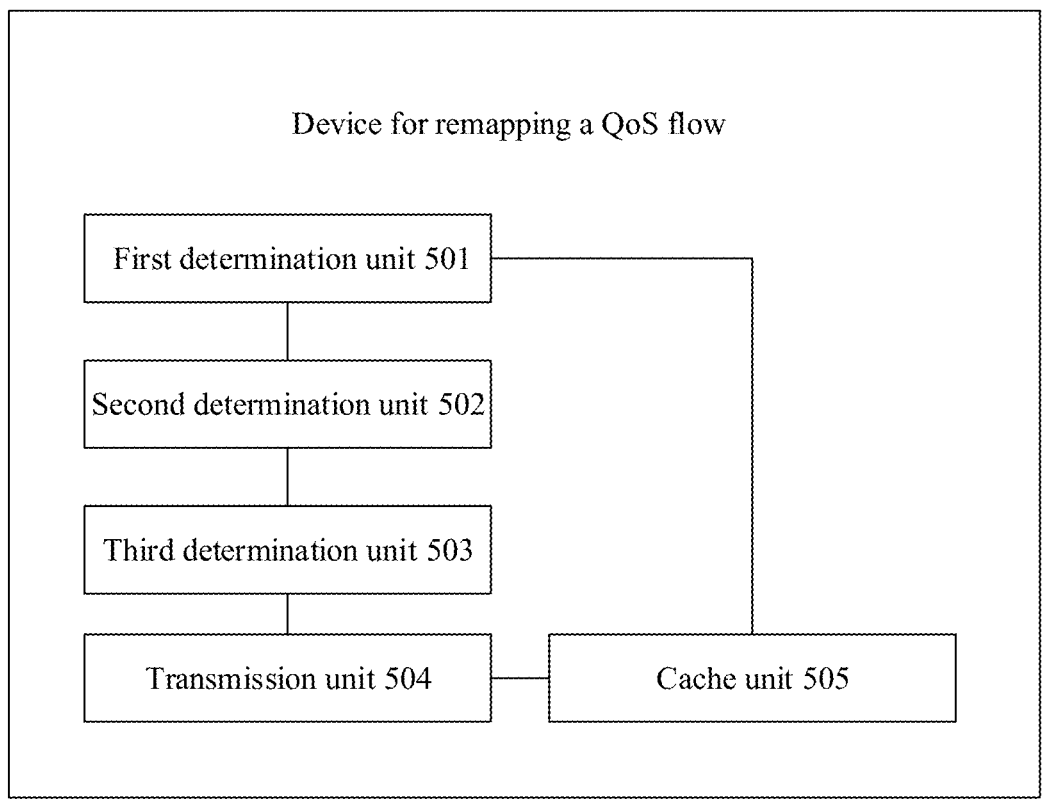
FIG. 5 is a schematic structural composition diagram of a device for remapping a QoS flow according to an embodiment of the disclosure.

In the technical solution of the embodiments of the disclosure, after a first device determines that a first QoS flow needs to be remapped from a first DRB to a second DRB, an SDAP entity of the first device determines a first data packet. The first data packet is the end data packet sent on the first DRB, in the first QoS flow. After the SDAP entity of the first device determines that transmission of the first data packet in the first Qos is completed on the first DRB, the first QoS flow is mapped to the second DRB, and data packets following the first data packet in the first QoS flow are transmitted on the second DRB. The technical solution of the embodiments of the disclosure can ensure that data of the QoS flow is transmitted without interruption and packet loss during remapping, and can be delivered in sequence at a receiving end FIG. 5 is a schematic structural composition diagram of a device for remapping a QoS flow according to an embodiment of the disclosure. The device is applied to a first device.

As shown in FIG. 5, the device for remapping a QoS flow includes a first determination unit 501, a second determination unit 502, a third determination unit 503 and a transmission unit 504.

The first determination unit 501 is configured to determine that a first QoS flow needs to be remapped from a first DRB to a second DRB.

The second determination unit 502 is configured to determine a first data packet by an SDAP entity of the first device. The first data packet is the end data packet sent on the first DRB, in the first QoS flow.

The third determination unit 503 is configured to determine, by the SDAP entity of the first device, that transmission of the first data packet in the first QoS flow is completed on the first DRB.

The transmission unit 504 is configured to map the first QoS flow to the second DRB and transmit, on the second DRB, data packets following the first data packet in the first QoS flow.

In an implementation manner, the third determination unit 503 is configured to: send, by the SDAP entity of the first device, first indication information to a PDCP entity corresponding to the first DRB, the first indication information indicating that the end data packet sent on the first DRB in the first QoS flow is the first data packet; and after the PDCP entity corresponding to the first DRB determines that the first data packet is successfully received by a second device, send second indication information to the SDAP entity of the first device, the second indication information indicating that transmission of the first data packet in the first QoS flow has completed on the first DRB.

In an implementation manner, the transmission unit 504 is configured to map data packets following the first data packet in the first QoS flow to the second DRB by the SDAP entity of the first device, and send the data packets following the first data packet in the first QoS flow by a PDCP entity corresponding to the second DRB.

In an implementation manner, the device further includes a cache unit 505.

The cache unit 505 is configured to cache, by the SDAP entity of the first device, data packets following the first data packet in the first QoS flow.

In an implementation manner, the transmission unit 504 is configured to transmit, on the second DRB, the cached data packets following the first data packet in the first QoS flow.

In an implementation manner, the first determination unit 501 is configured to determine that the first QoS flow needs to be remapped from the first DRB to the second DRB based on an obtained mapping relationship between the first QoS flow and the second DRB.

In an implementation manner, the mapping relationship between the first QoS flow and the second DRB is determined based on QoS of the first QoS flow or based on an RRC signaling.

In an implementation manner, the first device is a base station or a terminal.

Those skilled in the art should know that implementation functions of each unit in the device for remapping a QoS flow shown in FIG. 5 may be understood with reference to the related descriptions in the foregoing method for remapping a QoS flow. The functions of each unit in the device for remapping a QoS flow shown in FIG. 6 may be implemented through a program run on a processor, and may also be implemented through a specific logical circuit.

When being implemented in the form of a software function module and sold or used as an independent product, the device for remapping a QoS flow of the embodiments of the disclosure may also be stored in a computer-readable storage medium. Based on such an understanding, an essential part of the technical solutions of the disclosure or a part thereof making contributions to the conventional art may be embodied in form of software product. The computer software product is stored in a storage medium, including a plurality of instructions configured to enable a computer device (which may be a personal computer, a server, a first device or the like) to execute all or part of the method in each embodiment of the disclosure. The foregoing storage medium includes: various media capable of storing program codes such as a U disk, a mobile hard disk, a Read Only Memory (ROM), a magnetic disk or an optical disk. Therefore, the embodiments of the disclosure are not limited to any specific hardware and software combination.

Correspondingly, the embodiments of the disclosure further provide a non-transitory computer storage medium having stored thereon computer-executable instructions. The computer-executable instructions are executed by a processor to implement the above method for remapping a QoS flow of the embodiments of the disclosure.

Figure 6:
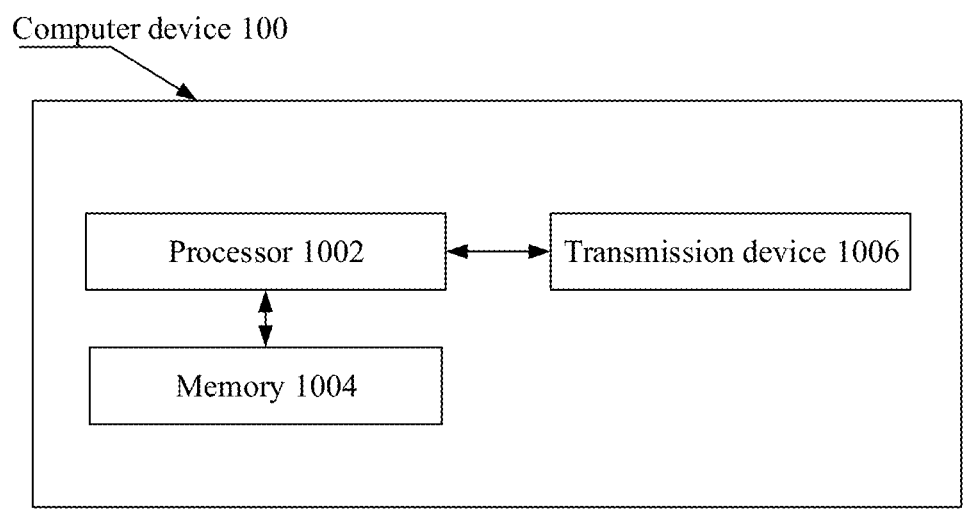
FIG. 6 is a schematic structural composition diagram of a computer device according to an embodiment of the disclosure.

FIG. 6 is a schematic structural composition diagram of a computer device according to an embodiment of the disclosure. The computer device may be a second device or may be a first device. As shown in FIG. 6, the computer device 100 may include one or more (only one shown in FIG. 6) processors 1002 (the processor 1002 may include, but is not limited to, a Micro Controller Unit (MCU) or a Field Programmable Gate Array (FPGA) or other processing devices), a memory 1004 for storing data, and a transmission device 1006 for a communication function. Those of ordinary skill in the art can understand that the structure shown in FIG. 6 is only schematic, and does not limit the structure of the above electronic device. For example, the computer terminal 100 may further include components more or fewer than the components shown in FIG. 6, or have a different configuration from that shown in FIG. 6.

The memory 1004 may be configured to store a software program and module of application software such as a program instruction/module corresponding to a method in the embodiments of the disclosure. The processor 1002 runs the software program and module stored in the memory 1004 to execute various functional applications and data processing, that is, for implementing the above method. The memory 1004 may include a high speed random access memory and may further include a nonvolatile memory such as one or more magnetic storage devices, flash memories or other nonvolatile solid-state memories. In some examples, the memory 1004 may further include a memory arranged remotely relative to the processor 1002, and the remote memory may be connected to the computer device 100 through a network. An example of the network includes, but is not limited to, the Internet, an intranet, a local area network, a mobile communication network and a combination thereof.

The transmission device 1006 is configured to receive or send data via a network. In a specific example, the above network may include a wireless network provided by a communication provider of the computer device 100. In an example, the transmission device 1006 includes a Network Interface Controller (NIC), which may be connected with another first device through a base station, for implementing communication with the Internet. In an example, the transmission device 1006 may be a Radio Frequency (RF) module, configured to communicate with the Internet in a wireless manner.

The technical solutions in the embodiments of the disclosure may be freely combined without conflicts.

In some embodiments provided by the disclosure, it is to be understood that the disclosed method and intelligent device may be implemented in another manner. The device embodiment described above is only schematic. For example, the units are divided according to the logic function, and may be divided in other manner during practical implementation. For example, multiple units or components may be combined or integrated into another system, or some characteristics may be neglected or not executed. In addition, coupling or direct coupling or communication connection between displayed or discussed components may be indirect coupling or communication connection through some interfaces, the device or the units, and may be electrical and mechanical or in other forms.

The units described as separate parts may be or may not be physically separated, and parts displayed as units may be or may not be physical units. That is, the parts may be located in the same place, or may also be distributed to multiple network units. Part of all of the units may be selected according to a practical requirement to achieve the purposes of the solutions of the embodiments.

In addition, functional units in each embodiment of the disclosure may be integrated into a second processing unit, each unit may also serve as an independent unit or two or more than two units may also be integrated into a unit. The integrated unit may be implemented in a hardware form, or may also be implemented in form of hardware and software functional unit.

The foregoing is only the specific implementation mode of the disclosure, however, the scope of protection of the disclosure is not limited thereto. Any variations or replacements apparent to those skilled in the art within the technical scope disclosed by the disclosure shall fall within the scope of protection of the disclosure.

The invention claimed is:

1. A method for remapping a Quality of Service (QoS) flow, comprising:
    after determining, by a first device, that a first QoS flow needs to be remapped from a first Data Radio Bearer (DRB) to a second DRB, determining, by a Service Data Adaptation Protocol (SDAP) entity of the first device, a first data packet, the first data packet being an end data packet sent on the first DRB, in the first QoS flow; and
    after determining, by the SDAP entity of the first device, that transmission of the first data packet in the first QoS flow is completed on the first DRB, mapping the first QoS flow to the second DRB, and transmitting, on the second DRB, data packets following the first data packet in the first QoS flow.

2. The method of claim 1, wherein determining, by the SDAP entity of the first device, that transmission of the first data packet in the first QoS flow is completed on the first DRB comprises:
    sending, by the SDAP entity of the first device, first indication information to a Packet Data Convergence Protocol (PDCP) entity corresponding to the first DRB, the first indication information indicating that the end data packet sent on the first DRB in the first QoS flow is the first data packet.

3. The method of claim 2, wherein determining, by the SDAP entity of the first device, that transmission of the first data packet in the first QoS flow is completed on the first DRB further comprises:

after determining, by the PDCP entity corresponding to the first DRB, that the first data packet is successfully received by a second device, sending second indication information to the SDAP entity of the first device, the second indication information indicating that transmission of the first data packet in the first QoS flow is completed on the first DRB.

4. The method of claim 1, wherein mapping the first QoS flow to the second DRB and transmitting, on the second DRB, data packets following the first data packet in the first QoS flow comprises:
mapping, by the SDAP entity of the first device, data packets following the first data packet in the first QoS flow to the second DRB, and sending, by a PDCP entity corresponding to the second DRB, the data packets following the first data packet in the first QoS flow.

5. The method of claim 1, further comprising:
after determining, by the first device, that the first QoS flow needs to be remapped from the first DRB to the second DRB, caching, by the SDAP entity of the first device, the data packets following the first data packet in the first QoS flow.

6. The method of claim 5, wherein mapping the first QoS flow to the second DRB and transmitting, on the second DRB, data packets following the first data packet in the first QoS flow comprises:
transmitting, on the second DRB, the cached data packets following the first data packet in the first QoS flow.

7. The method of claim 1, wherein determining, by the first device, that the first QoS flow needs to be remapped from a first DRB to a second DRB comprises:
determining, by the first device, that the first QoS flow needs to be remapped from the first DRB to the second DRB based on an obtained mapping relationship between the first QoS flow and the second DRB.

8. The method of claim 7, wherein the mapping relationship between the first QoS flow and the second DRB is determined based on a Radio Resource Control (RRC) signaling.

9. The method of claim 1, wherein the first device is a base station or a terminal.

10. A device for remapping a Quality of Service (QoS) flow, applied to a first terminal, the device comprising:
a processor;
a memory having stored thereon a computer program; and
a transmission device,
wherein the program is configured to run the computer program to execute operations of:
determining that a first QoS flow needs to be remapped from a first Data Radio Bearer (DRB) to a second DRB;
determining a first data packet by a Service Data Adaptation Protocol (SDAP) entity of the first device, the first data packet being an end data packet sent on the first DRB, in the first QoS flow; and
determining, by the SDAP entity of the first device, that transmission of the first data packet in the first QoS flow is completed on the first DRB,
wherein the transmission device is configured to map the first QoS flow to the second DRB and transmit, on the second DRB, data packets following the first data packet in the first QoS flow.

11. The device of claim 10, wherein the processor is further configured to run the computer program to execute an operation of:
sending, by the SDAP entity of the first device, first indication information to a Packet Data Convergence Protocol (PDCP) entity corresponding to the first DRB, the first indication information indicating that the end data packet sent on the first DRB in the first QoS flow is the first data packet.

12. The device of claim 11, wherein the processor is further configured to run the computer program to execute an operation of:
after the PDCP entity corresponding to the first DRB determines that the first data packet is successfully received by a second device, sending second indication information to the SDAP entity of the first device, the second indication information indicating that transmission of the first data packet in the first QoS flow is completed on the first DRB.

13. The device of claim 10, wherein the transmission device is configured to: map, by the SDAP entity of the first device, data packets following the first data packet in the first QoS flow to the second DRB; and send, by a PDCP entity corresponding to the second DRB, the data packets following the first data packet in the first QoS flow.

14. The device of claim 10, further comprising:
a cache configured to cache, by the SDAP entity of the first device, data packets following the first data packet in the first QoS flow.

15. The device of claim 14, wherein the transmission device is configured to transmit, on the second DRB, the cached data packets following the first data packet in the first QoS flow.

16. The device of claim 10, wherein the processor is further configured to run the computer program to execute an operation of: determining that the first QoS flow needs to be remapped from the first DRB to the second DRB based on an obtained mapping relationship between the first QoS flow and the second DRB.

17. The device of claim 16, wherein the mapping relationship between the first QoS flow and the second DRB is determined based on a Radio Resource Control (RRC) signaling.

18. The device of claim 10, wherein the first device is a base station or a terminal.

19. A non-transitory computer storage medium having stored thereon computer-executable instructions that when executed by a processor, implement operations of:
after determining, by a first device, that a first QoS flow needs to be remapped from a first Data Radio Bearer (DRB) to a second DRB, determining, by a Service Data Adaptation Protocol (SDAP) entity of the first device, a first data packet, the first data packet being an end data packet sent on the first DRB, in the first QoS flow; and
after determining, by the SDAP entity of the first device, that transmission of the first data packet in the first QoS flow is completed on the first DRB, mapping the first QoS flow to the second DRB, and transmitting, on the second DRB, data packets following the first data packet in the first QoS flow.

20. The non-transitory computer storage medium of claim 19, wherein the computer-executable instructions, when executed by the processor, implement an operation of:
sending, by the SDAP entity of the first device, first indication information to a Packet Data Convergence Protocol (PDCP) entity corresponding to the first DRB, the first indication information indicating that the end data packet sent on the first DRB in the first QoS flow is the first data packet.

* * * * *